US008892494B2

(12) United States Patent
Ono et al.

(10) Patent No.: US 8,892,494 B2
(45) Date of Patent: Nov. 18, 2014

(54) DEVICE FOR CLASSIFYING DEFECTS AND METHOD FOR ADJUSTING CLASSIFICATION

(75) Inventors: Makoto Ono, Yokohama (JP); Yohei Minekawa, Fujisawa (JP); Junko Konishi, Yokohama (JP); Takehiro Hirai, Ushiku (JP); Yuya Isomae, Hitachinaka (JP)

(73) Assignee: Hitachi High-Technologies Corporation, Tokyo (JP)

( * ) Notice: Subject to any disclaimer, the term of this patent is extended or adjusted under 35 U.S.C. 154(b) by 513 days.

(21) Appl. No.: 13/376,390

(22) PCT Filed: Jul. 8, 2010

(86) PCT No.: PCT/JP2010/061581
§ 371 (c)(1),
(2), (4) Date: Jan. 20, 2012

(87) PCT Pub. No.: WO2011/010557
PCT Pub. Date: Jan. 27, 2011

(65) Prior Publication Data
US 2012/0117010 A1 May 10, 2012

(30) Foreign Application Priority Data

Jul. 23, 2009 (JP) ................. 2009-172104

(51) Int. Cl.
G06F 15/18 (2006.01)
G06T 7/00 (2006.01)
(52) U.S. Cl.
CPC ....... *G06T 7/001* (2013.01); *G06T 2207/20076* (2013.01); *G06T 2207/30148* (2013.01); *G06T 2207/10056* (2013.01)
USPC .......................................................... 706/47
(58) Field of Classification Search
CPC ................. G06N 5/025; G06N 5/04
USPC .......................................................... 706/47
See application file for complete search history.

(56) References Cited

U.S. PATENT DOCUMENTS

2004/0028276 A1 2/2004 Okuda et al.
2004/0252878 A1 12/2004 Okuda et al.

FOREIGN PATENT DOCUMENTS

| JP | 2004-77165 | 3/2004 |
| JP | 2004-85503 | 3/2004 |
| JP | 2004-294360 | 10/2004 |
| JP | 2009-103508 | 5/2009 |
| WO | WO 2009/054102 A1 | 4/2009 |

OTHER PUBLICATIONS

L. Fei-Fei and P. Perona, "A Bayesian Hierarchical Model for Learning Natural Scene Categories", Computer Vision and Pattern Recognition, CVPR 2005, IEEE Computer Soc. Conf. on, IEEE, 2005, pp. 524-531.*
L. Oliveira et al., "Improving Cascading Classifiers with Particle Swarm Optimization", Document Analysis and Recognition, Proc. 8th Int'l Conf. on, IEEE, 2005, pp. 570-574.*
A. Vailaya et al., "Image Classification for Content-Based Indexing", IEEE Trans. on Image Processing, vol. 10, No. 1, Jan. 2001, pp. 117-130.*

* cited by examiner

*Primary Examiner* — Kakali Chaki
*Assistant Examiner* — Vincent Gonzales
(74) *Attorney, Agent, or Firm* — Antonelli, Terry, Stout & Kraus, LLP.

(57) ABSTRACT

Disclosed is a technique wherein an object that requires adjustment in order to increase the reliability of automatic classification can be easily identified. A device (140) for adjusting classification classifies defects into a first class group according to the feature amount of the defects that are obtained from image data obtained from an electron microscope (110), and classifies the defects into a second class group according to the feature amount of the defects classified into the first class group. And, the device (140) for adjusting the classification calculates classification performance by comparing the defects that have been classified into the second class group, and outputs the calculated classification performance in a predetermined display format to an output unit (180).

9 Claims, 19 Drawing Sheets

FIG. 3

| d | $X_1$ | $X_2$ | $X_3$ | $X_4$ | $X_5$ | $X_6$ | $X_7$ | $X_8$ |
|---|---|---|---|---|---|---|---|---|
| 1 | 0.53 | 0.33 | 0.44 | 0.13 | 0.45 | 0.81 | 0.05 | 0.31 |
| 2 | 0.23 | 0.13 | 0.65 | 0.25 | 0.19 | 0.45 | 0.58 | 0.41 |
| 3 | 0.80 | 0.45 | 0.15 | 0.89 | 0.28 | 0.51 | 0.29 | 0.70 |
| 4 | 0.41 | 0.70 | 0.05 | 0.51 | 0.78 | 0.55 | 0.61 | 0.18 |
| 5 | 0.38 | 0.47 | 0.59 | 0.60 | 0.49 | 0.29 | 0.28 | 0.57 |
| 6 | 0.66 | 0.40 | 0.31 | 0.38 | 0.51 | 0.33 | 0.53 | 0.31 |
| ⋮ | ⋮ | ⋮ | ⋮ | ⋮ | ⋮ | ⋮ | ⋮ | ⋮ |

FIG. 6

| | Main Class A | Main Class B | Main Class C | Main Class D | Purity(%) Accuracy(%) Correct |
|---|---|---|---|---|---|
| Sub Class 1; Protrusion | -<br>-<br>0 | 80.0<br>100.0<br>4 | 100.0<br>100.0<br>76 | -<br>-<br>0 | 98.8<br>100.0<br>80 |
| Sub Class 2; Particle | 93.9<br>100.0<br>31 | 93.2<br>71.9<br>41 | 75.0<br>100.0<br>9 | -<br>-<br>0 | 94.2<br>83.5<br>81 |
| Sub Class 3; Scratch | -<br>0.0<br>0 | -<br>-<br>0 | -<br>0.0<br>0 | 93.9<br>86.1<br>31 | 93.9<br>75.6<br>31 |
| Sub Class 4; Dent | -<br>-<br>0 | -<br>-<br>0 | -<br>-<br>0 | 37.5<br>75.0<br>3 | 37.5<br>60.0<br>3 |
| Sub Class 5; Pattern Defect | 100.0<br>100.0<br>21 | 57.9<br>84.6<br>22 | -<br>-<br>0 | -<br>-<br>0 | 72.9<br>97.9<br>43 |

FIG. 8

| ADC / Manual | Class 1 | Class 2 | Class 3 | Class 4 | Class 5 | Subtotal | Accuracy (%) |
|---|---|---|---|---|---|---|---|
| Class 1; Protrusion | 80 | 0 | 0 | 0 | 0 | 80 | 100.0 |
| Class 2; Particle | 0 | 81 | 0 | 0 | 16 | 97 | 83.5 |
| Class 3; Scratch | 0 | 5 | 31 | 5 | 0 | 41 | 75.6 |
| Class 4; Dent | 0 | 0 | 2 | 3 | 0 | 5 | 60.0 |
| Class 5; Pattern Defect | 1 | 0 | 0 | 0 | 43 | 44 | 97.7 |
| Subtotal | 81 | 86 | 33 | 8 | 59 | 267 | |
| Purity (%) | 98.8 | 94.2 | 93.9 | 37.5 | 72.9 | | |

FIG. 9                      ╭192a

| ADC<br>Manual | Class 1 | Class 2 | Class 3 | Class 4 | Class 5 | Subtotal | Accuracy (%) |
|---|---|---|---|---|---|---|---|
| Class 1;<br>Protrusion | 0 | 0 | 0 | 0 | 0 | 0 | - |
| Class 2;<br>Particle | 0 | 31 | 0 | 0 | 0 | 31 | 100.0 |
| Class 3;<br>Scratch | 0 | 2 | 0 | 0 | 0 | 2 | 0.0 |
| Class 4;<br>Dent | 0 | 0 | 0 | 0 | 0 | 0 | - |
| Class 5;<br>Pattern Defect | 0 | 0 | 0 | 0 | 21 | 21 | 100.0 |
| Subtotal | 0 | 33 | 0 | 0 | 21 | 54 | |
| Purity (%) | - | 93.9 | - | - | 100.0 | | |

| ADC<br>Manual | Class 1 | Class 2 | Class 3 | Class 4 | Class 5 | Subtotal | Accuracy (%) |
|---|---|---|---|---|---|---|---|
| Class 1; Protrusion | 4 | 0 | 0 | 0 | 0 | 4 | 100.0 |
| Class 2; Particle | 0 | 41 | 0 | 0 | 16 | 57 | 71.9 |
| Class 3; Scratch | 0 | 0 | 0 | 0 | 0 | 0 | - |
| Class 4; Dent | 0 | 0 | 0 | 0 | 0 | 0 | - |
| Class 5; Pattern Defect | 1 | 3 | 0 | 0 | 22 | 26 | 84.6 |
| Subtotal | 5 | 44 | 0 | 0 | 38 | 87 | |
| Purity (%) | 80.0 | 93.2 | - | - | 57.9 | | |

FIG. 11  /194a

| ADC \ Manual | Class 1 | Class 2 | Class 3 | Class 4 | Class 5 | Subtotal | Accuracy (%) |
|---|---|---|---|---|---|---|---|
| Class 1; Protrusion | 76 | 0 | 0 | 0 | 0 | 76 | 100.0 |
| Class 2; Particle | 0 | 9 | 0 | 0 | 0 | 9 | 100.0 |
| Class 3; Scratch | 0 | 3 | 0 | 0 | 0 | 3 | 0.0 |
| Class 4; Dent | 0 | 0 | 0 | 0 | 0 | 0 | - |
| Class 5; Pattern Defect | 0 | 0 | 0 | 0 | 0 | 0 | - |
| Subtotal | 76 | 12 | 0 | 0 | 0 | 88 | |
| Purity (%) | 100.0 | 75.0 | - | - | - | | 93.1 |

| ADC<br>Manual | Class 1 | Class 2 | Class 3 | Class 4 | Class 5 | Subtotal | Accuracy (%) |
|---|---|---|---|---|---|---|---|
| Class 1; Protrusion | 0 | 0 | 0 | 0 | 0 | 0 | - |
| Class 2; Particle | 0 | 0 | 0 | 0 | 0 | 0 | - |
| Class 3; Scratch | 0 | 0 | 31 | 5 | 0 | 36 | 86.1 |
| Class 4; Dent | 0 | 0 | 2 | 3 | 0 | 5 | 60.0 |
| Class 5; Pattern Defect | 0 | 0 | 0 | 0 | 0 | 0 | - |
| Subtotal | 0 | 0 | 33 | 8 | 0 | 41 | |
| Purity (%) | - | - | 93.9 | 37.5 | - | | |

FIG. 15

| Trial ID | $W_{B,2,5}$ | $W_{B,2,6}$ | $W_{B,5,3}$ | $W_{B,5,7}$ |
|---|---|---|---|---|
| 1 | +0.1 | +0.1 | ±0 | +0.1 |
| 2 | -0.1 | +0.1 | +0.1 | +0.1 |
| 3 | -0.1 | -0.1 | +0.1 | -0.1 |
| 4 | -0.1 | ±0 | ±0 | ±0 |
| 5 | +0.1 | -0.1 | -0.1 | ±0 |
| 6 | +0.1 | ±0 | +0.1 | -0.1 |
| 7 | +0.1 | -0.1 | +0.1 | +0.1 |
| 8 | +0.1 | +0.1 | ±0 | -0.1 |
| 9 | ±0 | -0.1 | ±0 | -0.1 |
| 10 | ±0 | +0.1 | +0.1 | ±0 |
| 11 | ±0 | ±0 | -0.1 | +0.1 |
| 12 | -0.1 | +0.1 | -0.1 | -0.1 |

FIG. 16

| Trial ID | Main Class B Purity(%) | | | Main Class B Accuracy(%) | | |
|---|---|---|---|---|---|---|
| | Sub Class 1 | Sub Class 2 | Sub Class 5 | Sub Class 1 | Sub Class 2 | Sub Class 5 |
| 1 | 80.1 | 93.1 | 66.1 | 100.0 | 82.5 | 84.6 |
| 2 | 79.8 | 87.5 | 69.5 | 100.0 | 83.2 | 87.3 |
| 3 | 80.5 | 91.5 | 58.5 | 100.0 | 85.1 | 83.5 |
| 4 | 81.0 | 93.9 | 61.7 | 100.0 | 83.3 | 92.8 |
| 5 | 80.0 | 90.6 | 62.3 | 100.0 | 82.5 | 98.8 |
| 6 | 80.5 | 94.1 | 59.0 | 100.0 | 82.0 | 98.3 |
| 7 | 80.5 | 90.1 | 66.3 | 100.0 | 84.5 | 81.5 |
| 8 | 80.0 | 91.5 | 57.9 | 100.0 | 80.9 | 85.0 |
| 9 | 79.8 | 94.5 | 62.3 | 100.0 | 85.5 | 84.3 |
| 10 | 80.5 | 94.3 | 65.1 | 100.0 | 84.1 | 91.5 |
| 11 | 80.5 | 90.8 | 67.8 | 100.0 | 81.0 | 92.5 |
| 12 | 80.0 | 89.8 | 60.3 | 100.0 | 86.5 | 86.9 |

FIG. 17

| Trial ID | Total Purity(%) | | | Total Accuracy(%) | | |
|---|---|---|---|---|---|---|
| | Sub Class 1 | Sub Class 2 | Sub Class 5 | Sub Class 1 | Sub Class 2 | Sub Class 5 |
| 1 | 98.8 | 91.0 | 79.2 | 100.0 | 90.3 | 91.5 |
| 2 | 98.8 | 88.2 | 81.7 | 100.0 | 90.7 | 93.1 |
| 3 | 98.8 | 90.2 | 73.4 | 100.0 | 91.9 | 90.8 |
| 4 | 98.8 | 91.3 | 75.9 | 100.0 | 90.8 | 96.2 |
| 5 | 98.8 | 89.7 | 76.4 | 100.0 | 90.3 | 99.4 |
| 6 | 98.8 | 91.4 | 73.8 | 100.0 | 90.0 | 99.1 |
| 7 | 98.8 | 89.5 | 79.4 | 100.0 | 91.5 | 89.6 |
| 8 | 98.8 | 90.2 | 72.9 | 100.0 | 89.3 | 91.7 |
| 9 | 98.8 | 91.6 | 76.4 | 100.0 | 92.1 | 91.3 |
| 10 | 98.8 | 91.5 | 78.5 | 100.0 | 91.3 | 95.5 |
| 11 | 98.8 | 89.8 | 80.5 | 100.0 | 89.4 | 96.0 |
| 12 | 98.8 | 89.3 | 74.8 | 100.0 | 92.7 | 92.8 |

DEVICE FOR CLASSIFYING DEFECTS AND METHOD FOR ADJUSTING CLASSIFICATION

TECHNICAL FIELD

The present invention relates to a technology of classifying defects into class groups by attribute data of the defects obtained from image data, which is obtained by imaging a test object. The present invention claims priority from Japanese Patent Application No. 2009-172104 filed on Jul. 23, 2009, and the content therein is incorporated herein by reference for designated countries that allow incorporation of documents by reference.

BACKGROUND ART

In recent years, for the purposes of quick recognition of the state of occurrence of defects on a surface of a wafer represented by a semiconductor integrated circuit and monitoring of the number of the occurred defects for each type of the defects, there have been developed technologies of taking an image of a defect portion for automatic classification.

One of the technologies of performing the automatic classification from image data of the defect portion is a technology called learning classification. In the learning classification technology, image data for learning is collected in advance and learned, to thereby optimize a classification model. Representative methods of the learning classification technology include discriminant analysis based on a neural network and the Bayes discriminant theory and the like.

Another technology of the automatic classification from the image data of the defect portion is a technology called a rule-based classification. In the rule-based classification technology, attribute data is extracted from image data, and a value of the attribute data is determined from an "IF-THEN" rule incorporated in a system, to thereby classify defects.

Further, in Patent Literature 1, a method of improving classification performance by combining a plurality of classification models is described. In the method described in Patent Literature 1, a classification model formed of a hierarchy of multiple levels of rough defect classification called main classes and detailed defect classification called sub classes is used.

CITATION LIST

Patent Literature

Patent Literature 1: JP 2004-294360 A

SUMMARY OF INVENTION

Technical Problem

With the technology described in Patent Literature 1, the disclosed classification model formed of the hierarchy of the multiple levels can classify defects with performance higher than the defect classification by the learning classification or the rule-based classification.

However, even with the technology described in Patent Literature 1, when purity, which is one of indices for measuring classification performance, is lower than a fixed value, for example, a defect classification result, which is an output of the automatic classification, cannot be trusted, and visual classification by a person is needed. The term "purity" as used herein can be defined as a ratio of defects that should be truly classified as a class, of defects automatically classified as the class.

In view of the above-mentioned circumstances, the present invention has an object of providing a technology capable of easily identifying objects that should be adjusted for increasing reliability of the automatic classification.

Solution to Problem

In order to attain the above-mentioned object, in the present invention, the classification performance of the defects classified as the class is evaluated to be output in a predetermined format.

For example, according to the present invention, there is provided a defect classification apparatus which classifies, based on attribute data of defects obtained from image data obtained by taking an image of a test object, the defects into a group of first classes, and classifies, based on the attribute data of the defects classified into the group of first classes, the defects into a group of second classes, including: a storage unit which stores, for each of the defects, classification answer information which identifies the group of second classes to which the each of the defects is to be classified; and a control unit, the control unit performing the processings of: classifying the defects into the group of second classes based on a value obtained by multiplying a likelihood value determined for each of the group of first classes, each of the group of second classes, and each type of the attribute data by a value of a weight coefficient determined for the each of the group of first classes, the each of the group of second classes, and the each type of the attribute data; comparing the second classes to which the defects are classified and the second class to which the defects are to be classified, which is identified by the classification answer information, to calculate classification performance in each combination of the first classes and the second classes and in the second classes to which the defects are classified from all the first classes; and outputting classification performance information which associates the calculated classification performance with the each combination of the first classes and the second classes, and the second classes to which the defects are classified from all the first classes, to an output unit.

Advantageous Effects of Invention

As described above, according to the present invention, the objects that should be adjusted for increasing the reliability of the automatic classification may be easily identified.

BRIEF DESCRIPTION OF DRAWINGS

FIG. 3 is a schematic diagram of a defect information table.

FIG. 6 is a schematic diagram of a classification performance information table.

FIG. 8 is a schematic diagram of a comparison table.

FIG. 9 is a schematic diagram of a comparison table showing classification performance of a sub classification class A.

FIG. 10 is a schematic diagram of a comparison table showing classification performance of a sub classification class B.

FIG. 11 is a schematic diagram of a comparison table showing classification performance of a sub classification class C.

FIG. 12 is a schematic diagram of a comparison table showing classification performance of a sub classification class D.

FIG. 15 is a schematic diagram of an orthogonal table.

FIG. 16 is a schematic diagram of a reevaluation table in a main class.

FIG. 17 is a schematic diagram of a reevaluation table in total.

DESCRIPTION OF EMBODIMENTS

Figure 1:
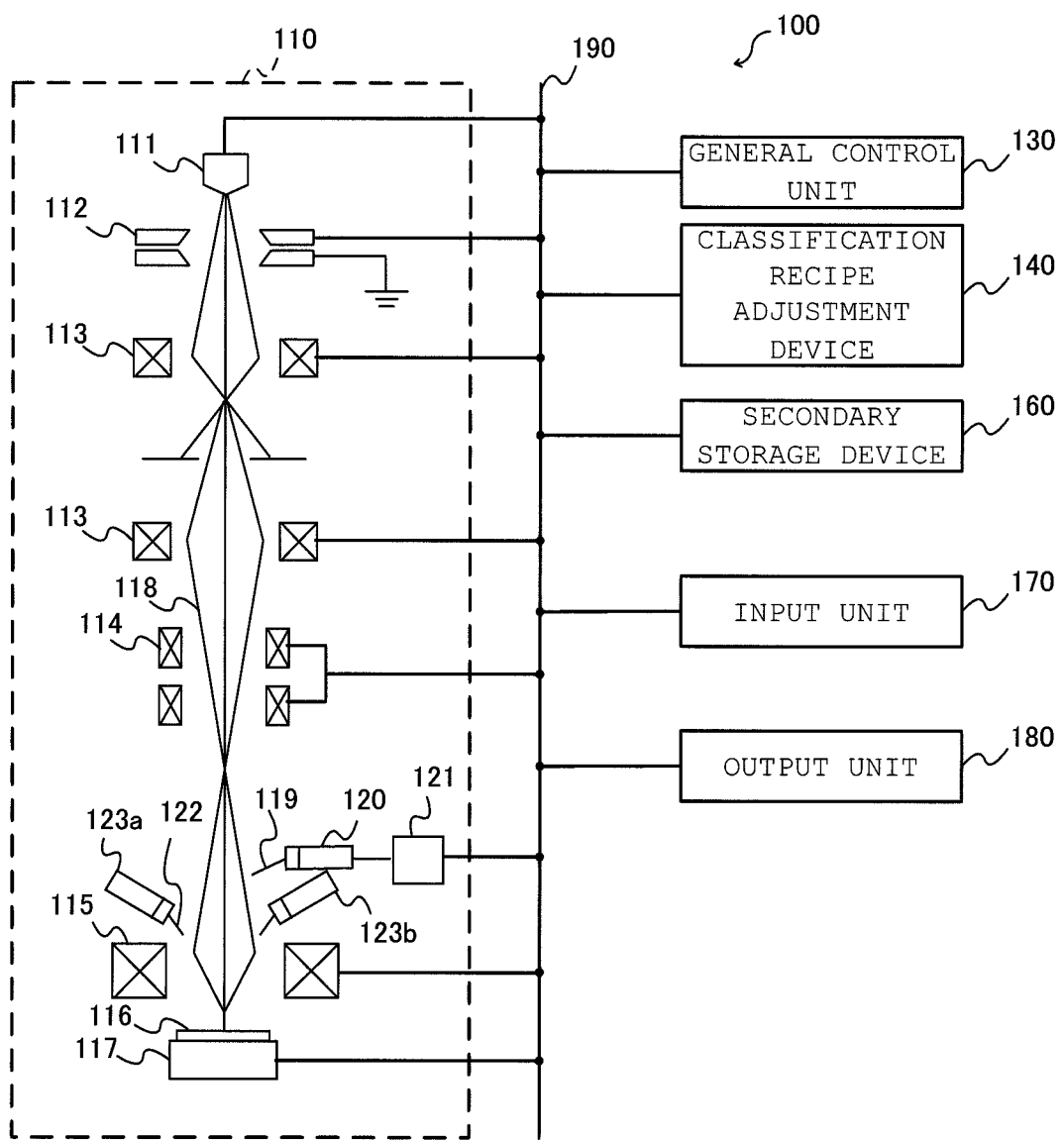
FIG. 1 is a schematic diagram of a defect classification apparatus.

FIG. 1 is a schematic diagram of a defect classification apparatus 100 according to an embodiment of the present invention. As illustrated in the figure, the defect classification apparatus 100 includes a scanning electron microscope (SEM) 110, a general control unit 130, a classification recipe adjustment device 140, a secondary storage device 160, an input unit 170, and an output unit 180, which are connected to one another via a bus 190.

The SEM 110 includes an electron source 111 for generating primary electrons 118, an acceleration electrode 112 for accelerating the primary electrons, a focusing lens 113 for converging the primary electrons 118, a deflector 114 for two-dimensionally scanning and deflecting the primary electrons 118, an objective lens 115 for converging the primary electrons 118 on a sample 116, a drive stage 117 on which the sample 116 is mounted, a detector 120 for detecting a secondary electron signal 119 generated from the sample 116, a digital conversion unit 121 for converting the signal detected by the detector 120 into a digital signal, and reflection electron detectors 123a and 123b for detecting a reflection electron signal 122, and those parts are connected to the general control unit 130 via the bus 190.

In FIG. 1, two reflection electron detectors 123a and 123b are arranged to be opposed to each other, and detect different components of the reflection electron signal 122 emitted from the sample 116.

The general control unit 130 controls overall processing in the defect classification apparatus 100.

The classification recipe adjustment device 140 performs automatic defect classification processing for automatically classifying defects from image data of an image taken by the SEM 110, and adjustment processing for adjusting a classification model in the automatic defect classification processing. Note that, the classification recipe adjustment device 140 is described in detail with reference to FIG. 2.

The secondary storage device 160 stores various parameters such as imaging conditions of the SEM 110 and operation conditions of the drive stage 117.

The input unit 170 receives input of information.

The output unit 180 outputs information.

Figure 2:
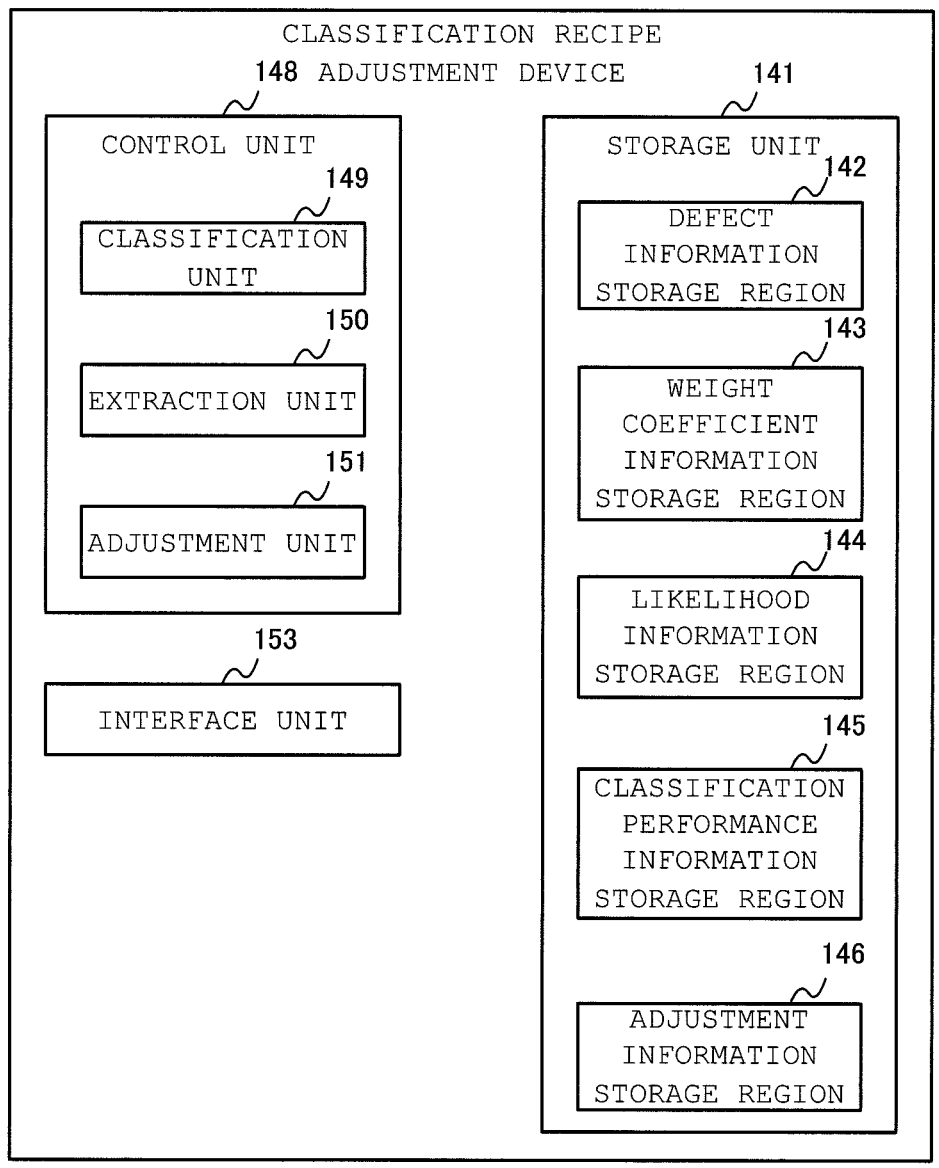
FIG. 2 is a schematic diagram of a classification recipe adjustment device.

FIG. 2 is a schematic diagram of the classification recipe adjustment device 140. As illustrated in the figure, the classification recipe adjustment device 140 includes a storage unit 141, a control unit 148, and an interface unit 153.

The storage unit 141 includes a defect information storage region 142, a weight coefficient information storage region 143, a likelihood information storage region 144, a classification performance information storage region 145, and an adjustment information storage region 146.

The defect information storage region 142 stores defect information for identifying attribute data of the defects extracted from the image data of the image taken by the SEM 110. For example, in this embodiment, a defect information table 142a as illustrated in FIG. 3 (schematic diagram of the defect information table 142a) is stored.

As illustrated in the figure, the defect information table 142a includes a defect number column 142b, an attribute data $X_1$ column 142c, an attribute data $X_2$ column 142d, an attribute data $X_3$ column 142e, an attribute data $X_4$ column 142f, an attribute data $X_5$ column 142g, an attribute data $X_6$ column 142h, an attribute data $X_7$ column 142i, and an attribute data $X_8$ column 142j.

The defect number column 142b stores a defect number, which is identification information for identifying a defect extracted from the image data of the image taken by the SEM 110.

The attribute data $X_1$ column 142c stores a value corresponding to predetermined attribute data $X_1$ of the defect identified in the defect number column 142b.

The attribute data $X_2$ column 142d stores a value corresponding to predetermined attribute data $X_2$ of the defect identified in the defect number column 142b.

The attribute data $X_3$ column 142e stores a value corresponding to predetermined attribute data $X_3$ of the defect identified in the defect number column 142b.

The attribute data $X_4$ column 142f stores a value corresponding to predetermined attribute data $X_4$ of the defect identified in the defect number column 142b.

The attribute data $X_5$ column 142g stores a value corresponding to predetermined attribute data $X_5$ of the defect identified in the defect number column 142b.

The attribute data $X_6$ column 142h stores a value corresponding to predetermined attribute data $X_6$ of the defect identified in the defect number column 142b.

The attribute data $X_7$ column 142i stores a value corresponding to predetermined attribute data $X_7$ of the defect identified in the defect number column 142b.

The attribute data $X_8$ column 142j stores a value corresponding to predetermined attribute data $X_8$ of the defect identified in the defect number column 142b.

Note that, in this embodiment, the attribute data of the defects is specified as eight types $X_1$ to $X_8$, but the number of types of the attribute data is not limited to eight.

Figure 4:
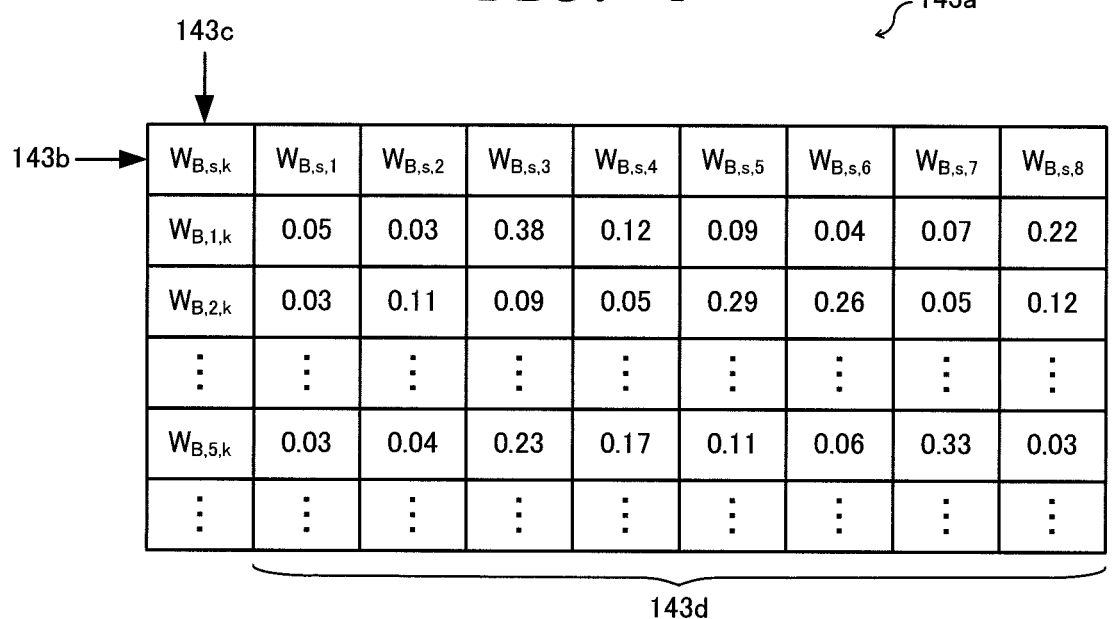
FIG. 4 is a schematic diagram of a weight coefficient information table.

Returning to FIG. 2, the weight coefficient information storage region 143 stores, for each combination of a sub class of the classification model and the attribute data of the defect, weight coefficient information for identifying a weight coefficient value used for classifying sub classes. For example, in this embodiment, a weight coefficient information table 143a as illustrated in FIG. 4 (schematic diagram of the weight coefficient information table 143a) is stored for each main class. Note that, FIG. 4 is the coefficient information table 143a of a main class B, but a coefficient information table similar to that of FIG. 4 is stored for each main class.

As illustrated in the figure, the weight coefficient information table 143a includes an attribute data identification row 143b, a sub class identification row 143c, and a value identification region 143d.

The attribute data identification row 143b stores information for identifying the attribute data of the defect. For example, in this embodiment, values of "k" in a weight coefficient $W_{B,s,k}$ (in this case, "1" to "8") correspond to the attribute data $X_1$ to $X_8$.

The sub class identification row 143c stores information for identifying the sub class of the classification model. For example, in this embodiment, values of "s" in the weight coefficient $W_{B,s,k}$ (in this case, "1" to "5") correspond to "sub class 1" to "sub class 5".

The value identification region 143d stores, for each main class, in a region identified by the attribute data identification row 143b and the sub class identification row 143c, a weight coefficient value corresponding to the attribute data identified by the attribute data identification row 143b and a sub class identified by the sub class identification row 143c.

Figure 5:
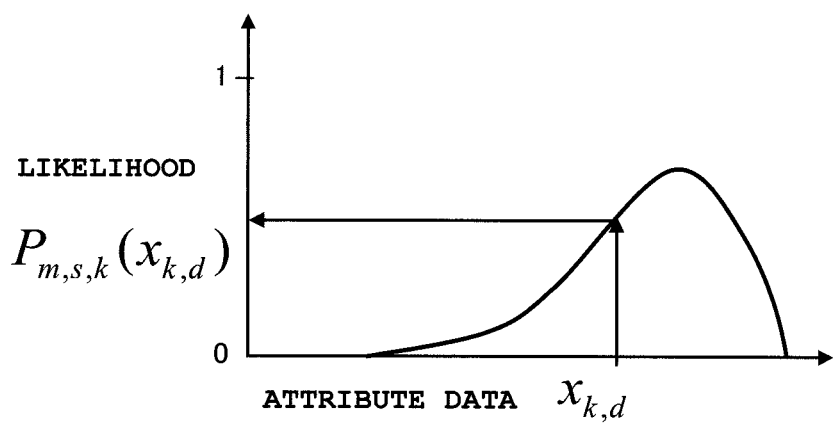
FIG. 5 is a schematic diagram of a function for identifying a value of attribute data and a likelihood value.

The likelihood information storage region 144 stores likelihood information for identifying a value of the attribute data and a likelihood value corresponding to the value of the attribute data. For example, in this embodiment, a function for identifying the value of the attribute data and the likelihood value as illustrated in FIG. 5 (schematic diagram of the function for identifying the value of the attribute data and the likelihood value) is stored in advance for each combination of the main classes (in this case, "A" to "D"), the sub classes (in this case, "1" to "5"), and the attribute data (in this case, "1" to "8").

Returning to FIG. 2, the classification performance information storage region 145 stores classification performance information for identifying a value of classification performance for each combination of a main class and sub classes classified from the main class and a value of the classification performance for each sub class. For example, in this embodiment, a classification performance information table 145a as illustrated in FIG. 6 (schematic diagram of the classification performance information table 145a) is stored.

As illustrated in the figure, the classification performance information table 145a includes a sub class column 145b, a main class A column 145c, a main class B column 145d, a main class C column 145e, a main class D column 145f, and an aggregate column 145g.

The sub class column 145b stores information for identifying sub classes. Here, in this embodiment, as the information for identifying the sub classes, information for identifying a name of each sub class, and information for identifying a type of defects classified as each sub class are stored.

The main class A column 145c stores information for identifying the classification performance when defects are classified from a main class A as the sub class identified by the sub class column 145b. Here, as the information for identifying the classification performance in this embodiment, the purity (%), an accuracy (%), and the number of defects for which the result of visual classification and the result of automatic classification are the same are stored. Note that, details of the purity and the accuracy are described later.

The main class B column 145d stores information for identifying the classification performance when defects are classified from a main class B as the sub class identified by the sub class column 145b.

The main class C column 145e stores information for identifying the classification performance when defects are classified from a main class C as the sub class identified by the sub class column 145b.

The main class D column 145f stores information for identifying the classification performance when defects are classified from a main class D as the sub class identified by the sub class column 145b.

The aggregate column 145g stores information for identifying the classification performance when defects are classified as the sub class identified by the sub class column 145b.

Returning to FIG. 2, the adjustment information storage region 146 stores adjustment information for identifying the classification performance of the sub class when the weight coefficient value is changed. Note that, the adjustment information stored in the adjustment information storage region 146 is described later.

The control unit 148 includes a classification unit 149, an extraction unit 150, and an adjustment unit 151.

The classification unit 149 classifies defects identified by the defect information stored in the defect information storage region 142 as a main class by a predetermined algorithm, and further classifies the defects classified as the main class into sub classes by using an algorithm that is different from the predetermined algorithm used to classify the defects as the main class.

Figure 7:
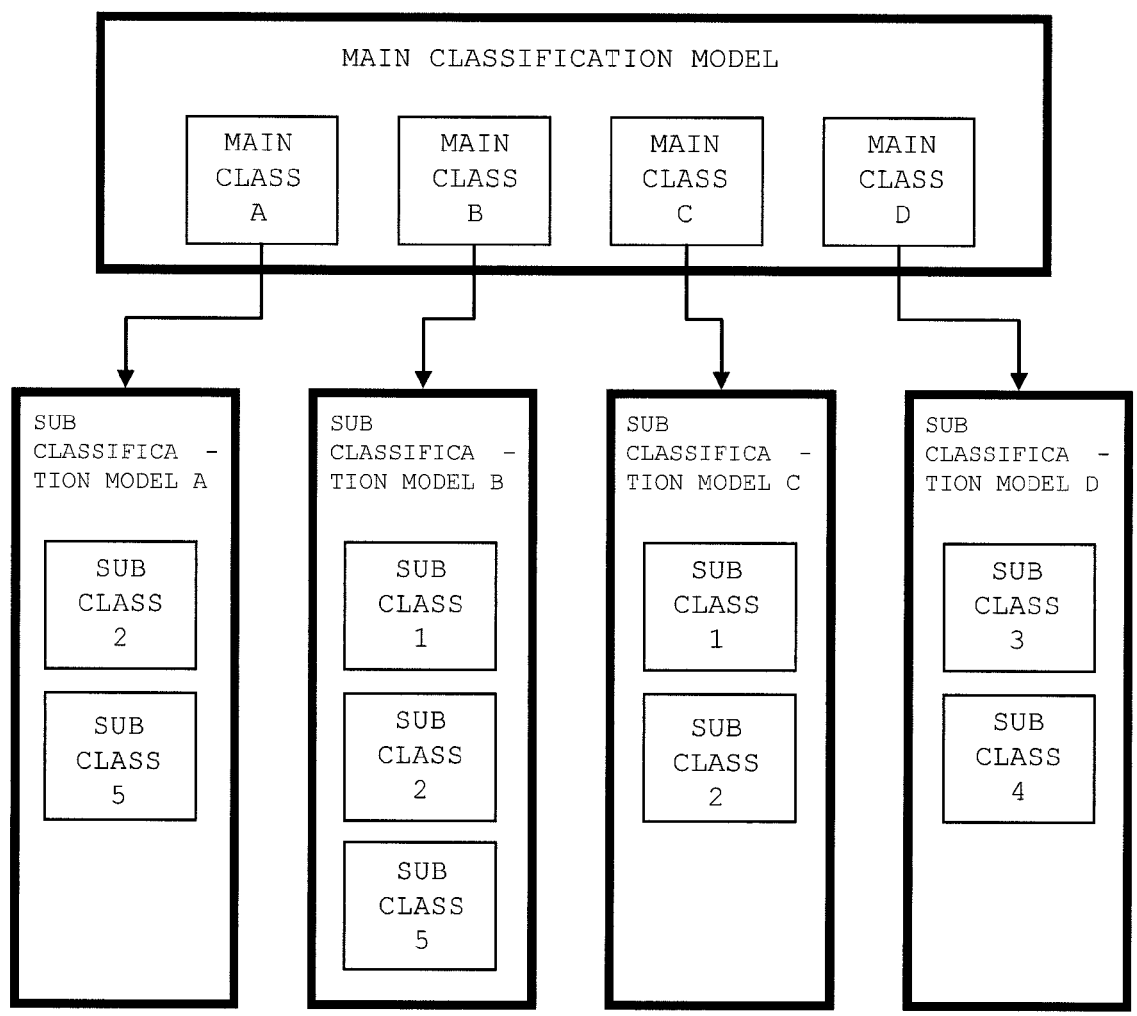
FIG. 7 is a schematic diagram illustrating an example of a hierarchical classification model.

For example, when the classification unit 149 acquires image data of a defect from the SEM 110 as illustrated in FIG. 7 (schematic diagram illustrating an example of hierarchical classification model), the classification unit 149 extracts a plurality of pieces of attribute data from the acquired image data and stores the pieces of extracted attribute data in the defect information table 142a.

Then, the classification unit 149 inputs those pieces of attribute data to a main classification model. The main classification model classifies the defects based on the input attribute data. In the example of FIG. 7, a large number of defects are classified into four types of main classes A, B, C, and D.

Next, the classification unit 149 inputs the attribute data to a sub classification model that is modeled for each of the main classes, and classifies the defects into detailed sub classes. In this example, defects classified as the main class A by the main classification model are classified into the sub class 2 and the sub class 5 by a sub classification model A, defects classified as the main class B are classified into the sub class 1, the sub class 2, and the sub class 5 by a sub classification model B, defects classified as the main class C are classified into the sub class 1 and the sub class 2 by a sub classification model C, and defects classified as the main class D are classified into the sub class 3 and the sub class 4 by a sub classification model D.

In such hierarchical classification model, the main classification model has the role of rough classification, and hence various methods such as an IF-THEN rule-based classification model and a learning classification model based on the Bayes discriminant theory may be applied. On the other hand, the sub classification model has the role of detailed classification, and hence the learning classification model is suitable. Note that, the algorithm used by the main classification model and the algorithm used by the sub classification model are different.

For example, in this embodiment, the classification unit 149 uses the mathematical expression represented by Equation (1) below as the sub classification model with respect to defects classified as the same main class, and classifies the defects as a sub class in which each defect has the largest value of y.

[Equation 1]

$$y_{m,s,d} = \sum_{k=1}^{N} (W_{m,s,k} P_{m,s,k}(x_{k,d})) \quad (1)$$

Here, w denotes the weight coefficient, and P(x) denotes the likelihood. Of the subscript indices of y, w, and P, m represents a main class number assigned to each main class to identify the main class (that is, sub classification model number), s represents a sub class number assigned to each sub class to identify the sub class, k represents a number allocated to each piece of the attribute data to identify the attribute data, d represents the defect number allocated to each defect to identify the defect, and y is calculated for each of the main class number, the sub class number, and the defect number. N is the number of types of the attribute data, which is, in this example, N=8.

Then, to $W_{m,s,k}$, the weight coefficient corresponding to the sub class number and the attribute data number is extracted from the weight coefficient information table 143a stored for each main class in the weight coefficient information storage region 143 and substituted.

Further, the value of a likelihood P(x) is acquired for the value x of the attribute data from the function of the likelihood stored in the likelihood information storage region 144. Note that, the function of the likelihood is defined for each combination of the main class number, the sub class number, and the attribute data number as described above. Note that, the function (distribution) of the likelihood is obtained by aggregating the learning data when the classification model is learned.

Further, the classification unit 149 receives via the input unit 170, for each defect identified by the defect information stored in the defect information storage region 142, an input of a visual classification result obtained by visual (manual) inspection and classification into the sub classes by the user, and aggregates the purity (%), the accuracy (%), and the number of defects for which the result of visual classification and the result of automatic classification are the same to be stored in the classification performance information table 145a.

Note that, the visual inspection result includes information for identifying at least the defect number, the sub class to which the defect identified by the defect number is classified, and when the input is received, the classification unit 149 stores the input as classification answer information in the storage unit 141.

Further, the classification unit 149 may also generate a comparison table 191a as illustrated in FIG. 8 (schematic diagram of the comparison table 191a) to be output to the output unit 180.

As illustrated in the figures, comparison table 191a includes Class 1 column 191b, Class 2 column 191c, Class 3 column 191d, Class 4 column 191e, Class 5 column 191f, Subtotal column 191g, Accuracy column 191h, Class 1 row 191j, Class 2 row 191k, Class 3 row 191l, Class 4 row 191m, Class 5 row 191n, Subtotal row 191o, and Purity row 191p.

Further, in the cell that intersect each of Class 1 column 191b, Class 2 column 191c, Class 3 column 191d, Class 4 column 191e, and Class 5 column 191f, and Class 1 row 191j, Class 2 row 191k, Class 3 row 191l, Class 4 row 191m, and Class 5 row 191n, the aggregated values of the results of visual classification and automatic classification are stored.

For example, in each of the Class 1 column 191b, the Class 2 column 191c, the Class 3 column 191d, the Class 4 column 191e, and the Class 5 column 191f, the number of defects classified as each of the sub classes 1 to 5 in the automatic classification by the classification unit 149 is stored, and in each of the Class 1 row 191j, the Class 2 row 191k, the Class 3 row 191l, the Class 4 row 191m, and the Class 5 row 191n, the number of defects classified as each of the sub classes 1 to 5 by the visual classification, of the defects classified as each of the sub classes 1 to 5 in the automatic classification by the classification unit 149.

A numerical value in each of the cells of the sub classes for which the row and the column are the same, that is, on the diagonal line from the upper left to the lower right of the comparison table 191a, is the number of defects for which the results of visual classification and automatic classification are the same and indicates the number of defects for which the automatic classification is correctly performed. On the other hand, a numerical value in each of the cells deviated from the diagonal line indicates the number of defects for which the results of visual classification and automatic classification are different.

Further, in Subtotal column 191g, the aggregated value (added value) of values stored in each row of Class 1 row 191j, Class 2 row 191k, Class 3 row 191l, Class 4 row 191m, and Class 5 row 191n is stored, and in Accuracy column 191h, the accuracy value of the calculated value stored in each row of Class 1 row 191j, Class 2 row 191k, Class 3 row 191l, Class 4 row 191m, and Class 5 row 191n is stored.

Further, in Subtotal row 191o, the aggregated value (added value) of values stored in each column of Class 1 column 191b, Class 2 column 191c, Class 3 column 191d, Class 4 column 191e, and Class 5 column 191f is stored, and in Purity row 191p, the purity value calculated by the value stored in each column of Class 1 column 191b, Class 2 column 191c, Class 3 column 191d, Class 4 column 191e, and Class 5 column 191f is stored.

Note that, the accuracy as a value indicating the classification performance is a value obtained by dividing, for each row of the table, the numerical value on the diagonal line by a subtotal in the second column from the right and multiplying the resultant by "100". On the other hand, the purity as a value indicating the classification performance is a value obtained by dividing, for each column of the table, the numerical value on the diagonal line by a subtotal in the second row from the bottom and multiplying the resultant by "100".

FIGS. 9 to 12 are comparison tables 192a to 195a obtained by dividing the comparison table 191a illustrated in FIG. 8 by the main classes. FIG. 9 is the comparison table 192a representing the classification performance of a sub classification class A, FIG. 10 is the comparison table 193a representing the classification performance of a sub classification class B, FIG. 11 is the comparison table 194a representing the classification performance of a sub classification class C, and FIG. 12 is the comparison table 195a representing the classification performance of a sub classification class D.

The classification unit 149 may also output those comparison tables 192a to 195a to the output unit 180.

The extraction unit 150 identifies, in the aggregate column 145g of the classification performance information table 145a illustrated in FIG. 6, a cell for which the value of the purity is less than 75% and the number of defects for which the result of visual classification and the result of automatic classification are the same is 10 or more, and displays the identified cell in a manner that is distinguishable from other cells (for example, in a color that is different from the other cells).

Similarly, the extraction unit 150 identifies, in the aggregate column 145g of the classification performance information table 145a illustrated in FIG. 6, and in rows including cells for which the value of the purity is less than 75% and the number of defects for which the result of visual classification and the result of automatic classification are the same is 10 or more, from among the main classes in which the value of the purity is stored, a main class for which the value of the purity is less than 75% and the number of defects for which the result of visual classification and the result of automatic classification are the same is 10 or more, and displays cells included in the identified main class (cells included in the column of the identified main class) in a manner that is distinguishable from other cells (for example, in a color that is different from the other cells).

Similarly, the extraction unit 150 identifies, from among the cells included in the main class identified as described above, a cell for which the number of defects for which the result of visual classification and the result of automatic classification are the same is 10 or more, and displays the identified cell in a manner that is distinguishable from other cells (for example, in a color that is different from the other cells). Further, the extraction unit 150 identifies the sub class corresponding to the thus identified cell from the sub class column 145*b*, and identifies the identified sub class as the sub class to be adjusted.

The above-mentioned processing by the extraction unit 150 is based on the following analysis.

For example, the user of the defect classification apparatus 100 may first check the rightmost column of the classification performance information table 145*a* illustrated in FIG. 6 to recognize that the purities of the sub class 4 and the sub class 5 are less than 75%.

Then, with respect to the sub class 4, the number of defects for which the result of visual classification and the result of automatic classification are the same is as small as 3, and hence it can be recognized that, even when the purity of the sub class 4 is improved, the sub class 4 does not make much contribution to reducing the number required for visual classification by a person. On the other hand, with respect to the sub class 5, the number of defects for which the result of visual classification and the result of automatic classification are the same is 43, and hence it can be recognized that, if it is possible to improve the purity of the sub class 5, the result of automatic classification is reliable and the number required for visual classification by a person can be reduced. Therefore, by making cells for which the purity is less than a predetermined value (in this example, 75%) and the number of defects for which the result of visual classification and the result of automatic classification are the same is equal to or more than a predetermined value (in this example, 10) distinguishable, the sub class for which the purity should be improved can be made easily recognizable by the user.

Next, the row of the sub class 5 is checked from right to left. Then, the sub class 5 includes numerical values in two rows of the main class A and the main class B, and it can be recognized that the defects are classified as the sub class 5 based on the sub classification model A and the sub classification model B. Further, it can be recognized that the sub class 5 has a purity of 100% for the sub classification model A of the main class A, which presents no problem, and has a purity as low as 57.9% for the sub classification model B of the main class B, and hence it can be recognized that the classification model that should be improved is the sub classification model B of the main class B.

Therefore, by making cells included in the main class for which the purity is less than the predetermined value (in this example, 75%) and the number of defects for which the result of visual classification and the result of automatic classification are the same is equal to or more than the predetermined value (in this example, 10) distinguishable, the main class for which the purity should be improved can be made easily recognizable by the user.

Next, the user focuses on the adjustment of the sub classification model B. The column of the main class B of this classification performance information table 145*a* includes values of the purity in the sub class 1, the sub class 2, and the sub class 5, and hence it can be recognized that the sub classification model B is a model for classification into the three sub classes. When parameters of the sub classification model B are adjusted to improve the purity of the sub class 5, the purities of the sub class 1 and the sub class 2 may be decreased.

However, with respect to the sub class 1, when the row of the sub class 1 is checked, it can be seen that the number of defects for which the result of visual classification and the result automatic classification are the same is as small as 4 in the main class B, and most defects in the sub class 1 are classified from the sub classification model C of the main class C. Similarly, the purity of the sub class 1 of the sub classification model C is as high as 100% and the total purity in the rightmost column of this table is also as high as 98.8%, and hence it can be anticipated that even when the parameters of the sub classification model B are adjusted, the effect on the purity of the sub class 1 is small. On the other hand, with respect to the sub class 2, when the row of the sub class 2 is checked, it can be seen that the purity for the sub classification model A of the main class A is 93.9%, the purity for the sub classification model B of the main class B is 93.2%, the purity for the sub classification model C of the main class C is 75%, and the total purity of the sub class 2 is 94.2%. Further, the number of defects for which the result of visual classification and the result of automatic classification are the same is 31 for the sub classification model A, is 41 for the sub classification model B, and is 9 for the sub classification model C, and it can be recognized that the contribution of the sub classification model B is high. Therefore, it can be recognized that, when the parameters of the sub classification model B are adjusted, careful attention must be paid to a decrease in purity of the sub class 2.

Therefore, by making, of the cells included in the main class identified as described above, cells for which the number of defects for which the result of visual classification and the result of automatic classification are the same is equal to or more than the predetermined value (here, 10) distinguishable, the sub class for which the purity should be improved can be made easily recognizable by the user.

As described above, through the processing by the extraction unit 150, by just checking the classification performance information table 145*a*, it can be recognized which sub classification model should be adjusted and, when the sub classification model is adjusted, what should be paid attention to.

Note that, the classification performance information table 145*a* describes the purity, the accuracy, and the number of defects for which the result of visual classification and the result of automatic classification are the same in each cell, but the effect is not affected even when the accuracy is not described. Alternatively, a table of only the purity, and a table of only the number of defects for which the result of visual classification and the result of automatic classification are the same may be created separately. In addition, transposition of the rows and the columns is within the scope of the present invention. Alternatively, instead of displaying the table on the output unit 180, the table may be processed internally to extract the sub classification models and the sub classes.

Returning to FIG. 2, the adjustment unit 151 adjusts the sub classification model used by the classification unit 149 described above. Note that, the processing by the adjustment unit 151 is described in detail with reference to FIG. 14.

The interface unit 153 transmits and receives information via the bus 190.

Figure 13:
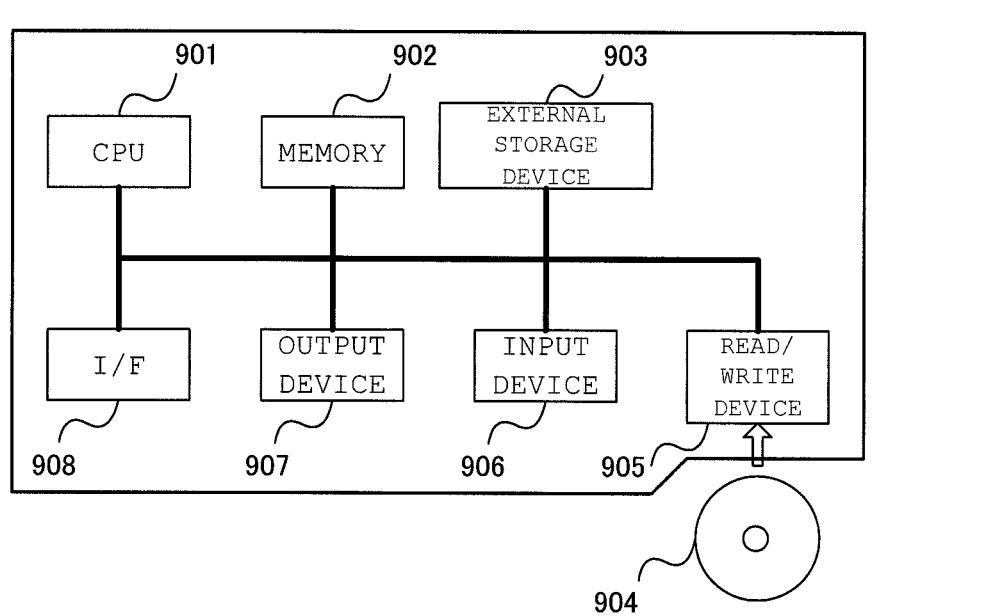
FIG. 13 is a schematic diagram of a computer.

The classification recipe adjustment device 140 described above may be realized by a computer 900 as illustrated in, for example, FIG. 13 (schematic diagram of the computer 900), including a central processing unit (CPU) 901, a memory 902, an external storage device 903 such as a hard disk drive (HDD), a read/write device 905 for reading and writing information from and to a portable recording medium 904 such as a compact disk (CD) or a digital versatile disk (DVD), an input device 906 such as a keyboard and a mouse, an output device 907 such as a display, and an I/F 908 for connecting to the bus.

For example, the storage unit 141 may be realized when the CPU 901 uses the memory 902 or the external storage device 903, the control unit 148 may be realized when a predetermined program stored in the external storage device 903 is loaded in the memory 902 and is executed by the CPU 901, and the interface unit 153 may be realized when the CPU 901 uses the I/F 908.

The predetermined program may be downloaded from the recording medium 904 via the read/write device 905 or from a network via the I/F 908 to the external storage device 903, and then loaded in the memory 902 to be executed by the CPU 901. Alternatively, the predetermined program may be loaded directly from the recording medium 904 via the read/write device 905 or from the network via the I/F 908 to the memory 902 to be executed by the CPU 901.

Figure 14:
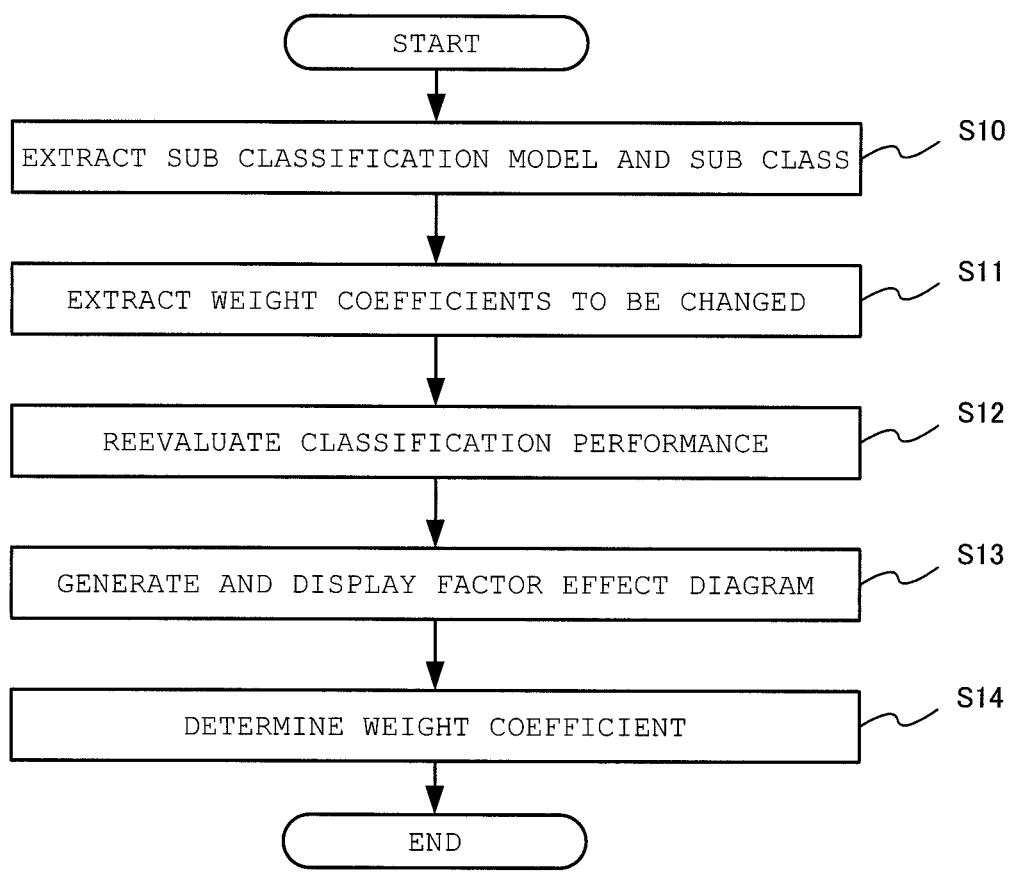
FIG. 14 is a flow chart illustrating extraction processing by an extraction unit and processing of adjusting a sub classification model by an adjustment unit.

FIG. 14 is an example of a flow chart illustrating the extraction processing by the extraction unit 150 and the processing of adjusting the sub classification model by the adjustment unit 151.

First, the extraction unit 150 extracts, from the classification performance information table 145a stored in the classification performance information storage region 145, the sub class to be adjusted, and extracts the sub classification model corresponding to the sub class (S10).

For example, the extraction unit 150 identifies, in the aggregate column 145g of the classification performance information table 145a, and in a row including cells for which the value of the purity is less than 75% and the number of defects for which the result of visual classification and the result of automatic classification are the same is 10 or more, from among the main classes in which the value of the purity is stored, a main class for which the value of the purity is less than 75% and the number of defects for which the result of visual classification and the result of automatic classification are the same is 10 or more. Further, the extraction unit 150 identifies, from among cells included in the identified main class, a cell for which the number of defects for which the result of visual classification and the result of automatic classification are the same is 10 or more, and identifies the sub class corresponding to the identified cell from the sub class column 145b. The main class and the sub class, which are identified as described above, are extracted as adjustment targets. In the classification performance information table 145a illustrated in FIG. 6, through the above-mentioned processing, the sub class 2 and the sub class 5 are extracted as the adjustment targets.

Next, the adjustment unit 151 extracts weight coefficients corresponding to the main class and the sub class extracted in Step S11 as the adjustment targets from the weight coefficient information storage region 143 (S11).

For example, the adjustment unit 151 extracts, from the weight coefficient information table 143a as illustrated in FIG. 4, the weight coefficients stored in the row of the sub class 2 and the row of the sub class 5.

Here, in this embodiment, from the row of the sub class 2, the weight coefficient having the largest value and the weight coefficient having the second largest value are extracted. Specifically, the weight coefficient of 0.29 at k=5 and the weight coefficient of 0.26 at k=6 are extracted. Similarly, from the row of the sub class 5, the weight coefficient having the largest value and the weight coefficient having the second largest value are extracted. Specifically, the weight coefficient of 0.33 at k=7 and the weight coefficient of 0.23 at k=3 are extracted. Note that, the number of the extracted weight coefficients may be a predetermined number, or all the weight coefficients stored in the target row may be extracted.

Next, the adjustment unit 151 changes values of the weight coefficients extracted in Step S11 and reevaluates the classification performance (S12).

For example, in this embodiment, the adjustment unit 151 generates an orthogonal table in design of experiments. With the extracted four types of weight coefficients as factors, the orthogonal table is generated with three or five levels. In this embodiment, two types of weight coefficients are extracted from each of two sub classes, and hence four types of weight coefficients are used as the factors. However, six types of weight coefficients may be used when there are three sub classes to be adjusted, and eight types of weight coefficients may be used when there are four sub classes to be adjusted. Further, which of three levels, five levels, or more levels are used may be determined in advance.

FIG. 15 is a schematic diagram of an orthogonal table 146a generated with four types of extracted weight coefficients as the factors and with three levels.

As illustrated in the figure, the orthogonal table 146a includes a trial ID column 146b, a $W_{B,2,5}$ column 146c, a $W_{B,2,6}$ column 146d, a $W_{B,5,3}$ column 146e, and a $W_{B,5,7}$ column 146f.

The trial ID column 146b stores identification information capable of identifying an experiment identified in each row. In this case, consecutive natural numbers are allocated sequentially to the rows from above as trial IDs.

The $W_{B,2,5}$ column 146c stores information for identifying a value to be added to or subtracted from a weight coefficient $W_{B,2,5}$ used to the attribute data $X_5$ extracted in Step S11, of the weight coefficients of the main class B and the sub class 2 extracted in Step S10.

The $W_{B,2,6}$ column 146d stores information for identifying a value to be added to or subtracted from a weight coefficient $W_{B,2,6}$ used to the attribute data $X_6$ extracted in Step S11, of the weight coefficients of the main class B and the sub class 2 extracted in Step S10.

The $W_{B,5,3}$ column 146e stores information for identifying a value to be added to or subtracted from a weight coefficient $W_{B,5,3}$ used to the attribute data $X_3$ extracted in Step S11, of the weight coefficients of the main class B and the sub class 5 extracted in Step S10.

The $W_{B,5,7}$ column 146f stores information for identifying a value to be added to or subtracted from a weight coefficient $W_{B,5,7}$ used to the attribute data $X_7$ extracted in Step S11, of the weight coefficients of the main class B and the sub class 5 extracted in Step S10.

Here, in this embodiment, the original weight coefficient (±0), a weight coefficient obtained by adding 0.1 to the original weight coefficient, and a weight coefficient obtained by subtracting 0.1 from the original weight coefficient are prepared to perform each experiment (reexamination of the classification performance). That is, in the above description, the change amount of the weight coefficient is 0.1, but the change amount is not limited to 0.1 and another value may be set in advance.

Note that, the thus generated orthogonal table 146a is stored in the adjustment information storage region 146.

Then, the adjustment unit 151 changes the value of the weight coefficient for each trial ID stored in the trial ID column 146b of the orthogonal table 146a to classify the sub classes again by using Equation (1) described above, and compares the result of classification with the result of visual classification received as an input via the input unit 170, to thereby calculate values of the purity and the accuracy of each of the sub class 1, the sub class 2, and the sub class 3 in the main class B and calculate values of the purity and the accuracy of each of the sub class 1, the sub class 2, and the sub class 3 in all the main classes.

The thus calculated values of the purity and the accuracy in the main class and total values of the purity and the accuracy are stored in a reevaluation table 146g in the main class as illustrated in FIG. 16 (schematic diagram of the reevaluation table 146g in the main class) and a reevaluation table 146q in total as illustrated in FIG. 17 (schematic diagram of the reevaluation table 146q in total).

As illustrated in FIG. 16, the reevaluation table 146g in the main class includes a trial ID column 146h, a main class purity column 146i, and a main class accuracy column 146m, the main class purity column 146i includes a sub class 1 column 146j, a sub class 2 column 146k, and a sub class 5 column 146l, and the main class accuracy column 146m includes a sub class 1 column 146n, a sub class 2 column 146o, and a sub class 5 column 146p.

The trial ID column 146h stores a trial ID corresponding to the trial ID stored in the trial ID column 146b of the orthogonal table 146a.

The sub class 1 column 146j of the main class purity column 146i stores information for identifying the value of the purity of the main class (in this example, the main class B) to be inspected for the number of defects classified as the sub class 1 by the weight coefficient in the row of the orthogonal table 146a in which the trial ID column 146b stores the trial ID identified in the trial ID column 146h. Note that, the method of calculating the value of the purity is the same as the method used in calculating the value to be stored in the cell corresponding to the sub class 1 of the main class B column 145d of the classification performance information table 145a.

The sub class 2 column 146k of the main class purity column 146i stores information for identifying the value of the purity of the main class (in this example, the main class B) to be inspected for the number of defects classified as the sub class 2 by the weight coefficient in the row of the orthogonal table 146a in which the trial ID column 146b stores the trial ID identified in the trial ID column 146h. Note that, the method of calculating the value of the purity is the same as the method used in calculating the value to be stored in the cell corresponding to the sub class 2 of the main class B column 145d of the classification performance information table 145a.

The sub class 5 column 146l of the main class purity column 146i stores information for identifying the value of the purity of the main class (in this example, the main class B) to be inspected for the number of defects classified as the sub class 5 by the weight coefficient in the row of the orthogonal table 146a in which the trial ID column 146b stores the trial ID identified in the trial ID column 146h. Note that, the method of calculating the value of the purity is the same as the method used in calculating the value to be stored in the cell corresponding to the sub class 5 of the main class B column 145d of the classification performance information table 145a.

The sub class 1 column 146n of the main class accuracy column 146m stores information for identifying the value of the accuracy of the main class (in this example, the main class B) to be inspected for the number of defects classified as the sub class 1 by the weight coefficient in the row of the orthogonal table 146a in which the trial ID column 146b stores the trial ID identified in the trial ID column 146h. Note that, the method of calculating the value of the accuracy is the same as the method used in calculating the value to be stored in the cell corresponding to the sub class 1 of the main class B column 145d of the classification performance information table 145a.

The sub class 2 column 146o of the main class accuracy column 146m stores information for identifying the value of the accuracy of the main class (in this example, the main class B) to be inspected for the number of defects classified as the sub class 2 by the weight coefficient in the row of the orthogonal table 146a in which the trial ID column 146b stores the trial ID identified in the trial ID column 146h. Note that, the method of calculating the value of the accuracy is the same as the method used in calculating the value to be stored in the cell corresponding to the sub class 2 of the main class B column 145d of the classification performance information table 145a.

The sub class 5 column 146p of the main class accuracy column 146m stores information for identifying the value of the accuracy of the main class (in this example, the main class B) to be inspected for the number of defects classified as the sub class 5 by the weight coefficient in the row of the orthogonal table 146a in which the trial ID column 146b stores the trial ID identified in the trial ID column 146h. Note that, the method of calculating the value of the accuracy is the same as the method used in calculating the value to be stored in the cell corresponding to the sub class 5 of the main class B column 145d of the classification performance information table 145a.

As illustrated in FIG. 17, the reevaluation table in total 146q includes a trial ID column 146r, a total purity column 146s, and a total accuracy column 146w, the total purity column 146s includes a sub class 1 column 146t, a sub class 2 column 146u, and a sub class 5 column 146v, and the total accuracy column 146w includes a sub class 1 column 146x, a sub class 2 column 146y, and a sub class 5 column 146z.

The trial ID column 146r stores a trial ID corresponding to the trial ID stored in the trial ID column 146b of the orthogonal table 146a.

The sub class 1 column 146t of the total purity column 146s stores information for identifying the value of the purity in all the main classes of the number of defects classified as the sub class 1 by the weight coefficient in the row of the orthogonal table 146a in which the trial ID column 146b stores the trial ID identified in the trial ID column 146r. Note that, the method of calculating the value of the purity is the same as the method used in calculating the value to be stored in the cell corresponding to the sub class 1 of the aggregate column 145g of the classification performance information table 145a.

The sub class 2 column 146u of the total purity column 146s stores information for identifying the value of the purity in all the main classes of the number of defects classified as the sub class 2 by the weight coefficient in the row of the orthogonal table 146a in which the trial ID column 146b stores the trial ID identified in the trial ID column 146r. Note that, the method of calculating the value of the purity is the same as the method used in calculating the value to be stored in the cell corresponding to the sub class 2 of the aggregate column 145g of the classification performance information table 145a.

The sub class 5 column 146v of the total purity column 146s stores information for identifying the value of the purity in all the main classes of the number of defects classified as the sub class 5 by the weight coefficient in the row of the orthogonal table 146a in which the trial ID column 146b stores the trial ID identified in the trial ID column 146r. Note that, the method of calculating the value of the purity is the same as the method used in calculating the value to be stored in the cell corresponding to the sub class 5 of the aggregate column 145g of the classification performance information table 145a.

The sub class 1 column 146x of the total accuracy column 146w stores information for identifying the value of the accuracy in all the main classes of the number of defects classified as the sub class 1 by the weight coefficient in the row of the orthogonal table 146a in which the trial ID column 146b stores the trial ID identified in the trial ID column 146r. Note that, the method of calculating the value of the accuracy is the same as the method used in calculating the value to be stored in the cell corresponding to the sub class 1 of the aggregate column 145g of the classification performance information table 145a.

The sub class 2 column 146y of the total accuracy column 146w stores information for identifying the value of the accuracy in all the main classes of the number of defects classified as the sub class 2 by the weight coefficient in the row of the orthogonal table 146a in which the trial ID column 146b stores the trial ID identified in the trial ID column 146r. Note that, the method of calculating the value of the accuracy is the same as the method used in calculating the value to be stored in the cell corresponding to the sub class 2 of the aggregate column 145g of the classification performance information table 145a.

The sub class 5 column 146z of the total accuracy column 146w stores information for identifying the value of the accuracy in all the main classes of the number of defects classified as the sub class 5 by the weight coefficient in the row of the orthogonal table 146a in which the trial ID column 146b stores the trial ID identified in the trial ID column 146r. Note that, the method of calculating the value of the accuracy is the same as the method used in calculating the value to be stored in the cell corresponding to the sub class 5 of the aggregate column 145g of the classification performance information table 145a.

Returning to FIG. 14, the adjustment unit 151 creates a factor effect diagram from the orthogonal table 146a, the reevaluation table 146g in the main class, and the reevaluation table 146q in total, which are stored in the adjustment information storage region 146, to be output to the output unit 180 (S13).

Figure 18:
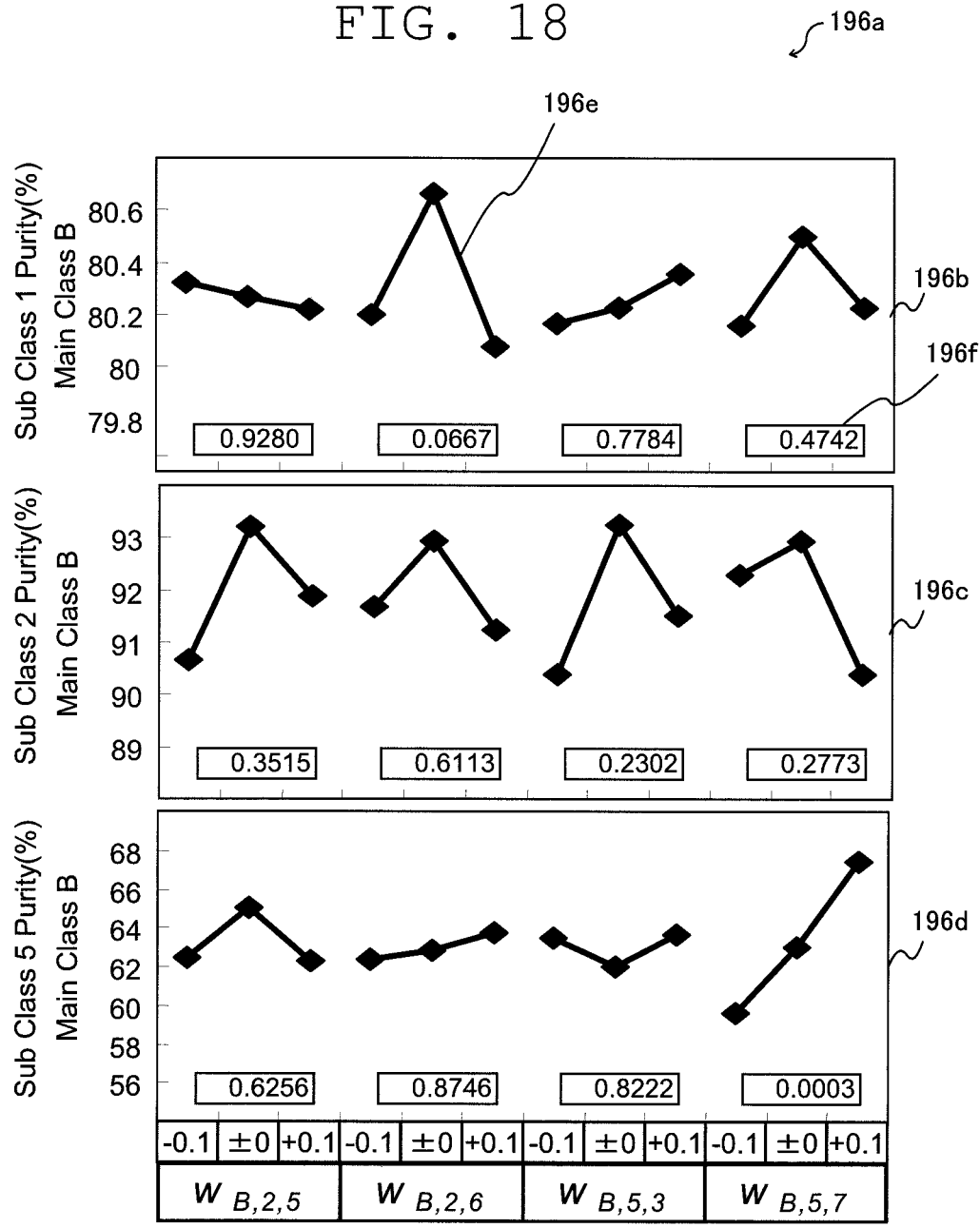
FIG. 18 is a schematic diagram of a first factor effect diagram.
Figure 19:
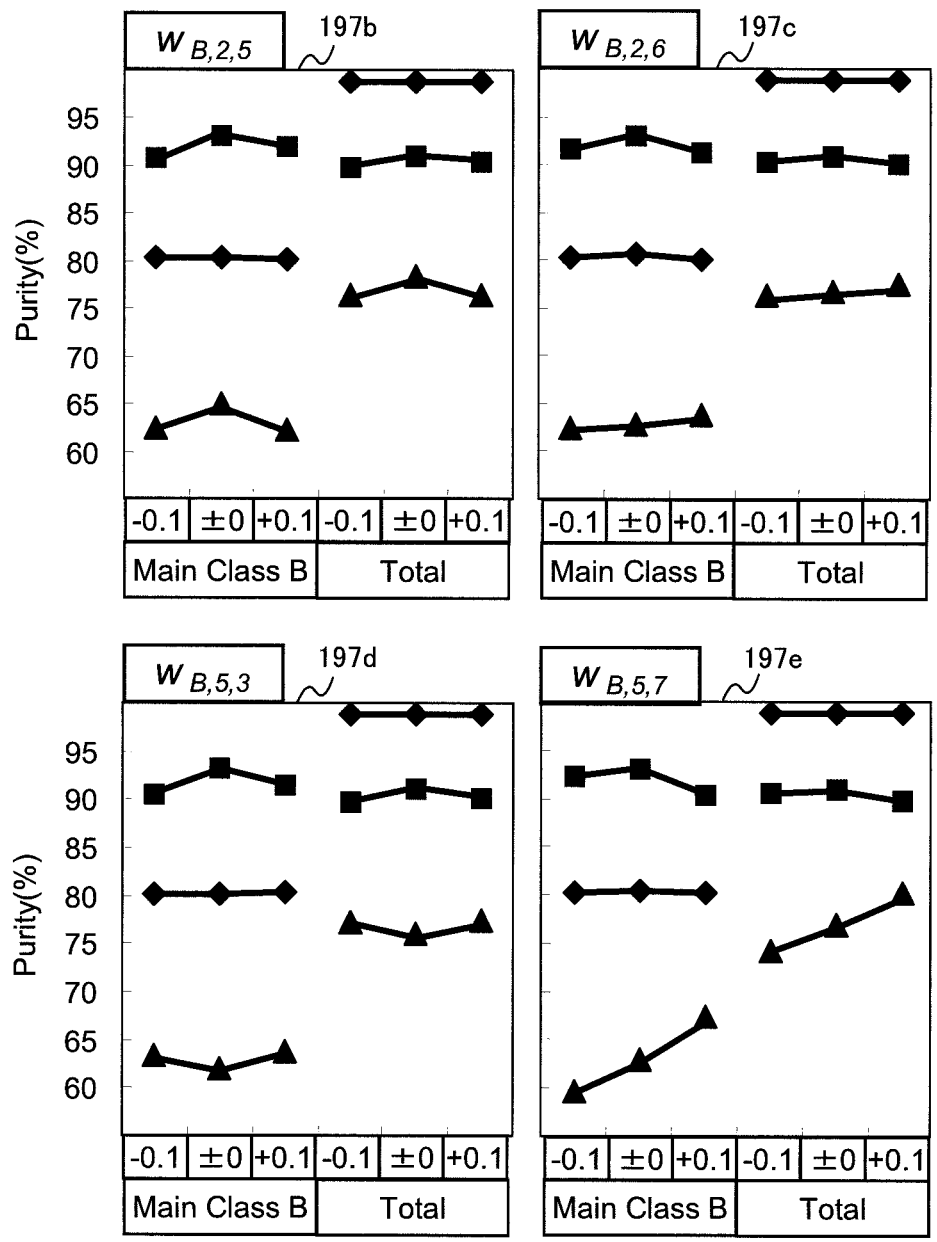
FIG. 19 is a schematic diagram of a second factor effect diagram.

For example, the adjustment unit 151 creates at least one of a first factor effect diagram 196a as illustrated in FIG. 18 (schematic diagram of the first factor effect diagram 196a) and a second factor effect diagram 197a as illustrated in FIG. 19 (schematic diagram of the second factor effect diagram 197a) to be output to the output unit 180.

The first factor effect diagram 196a illustrated in FIG. 18 is a factor effect diagram of the purities of the main class B, that is, the sub classification model B, and includes a sub class 1 display region 196b, a sub class 2 display region 196c, and a sub class 5 display region 196d.

In each of the display regions 196b, 196c, and 196d, for each of levels ("−0.1", "±0", and "+0.1") of the weight coefficients, an average value of the purities of the level is plotted, and the average values of the three levels are expressed as a polygonal line by being connected by lines for each weight coefficients.

For example, a polygonal line 196e expresses the purities of the sub class 1 in the sub classification model B with respect to the three levels of the weight coefficient to the sixth attribute data $X_6$ of the sub class 2 in the sub classification model B. When the level of ±0 has the largest value of the three plotted points as in the polygonal line 196e, it means that the original weight coefficient is the optimal solution.

Further, the adjustment unit 151 calculates significance probability, which is obtained by executing analysis of variance on each weight coefficient, to be displayed in a significance probability display region 196f. In this case, as the value of the significance probability becomes smaller, there is a larger statistical difference between the plotted points of the polygonal line of the target weight coefficient, and hence it can be recognized that the effect on the purities becomes larger.

The second factor effect diagram 197a illustrated in FIG. 19 is a factor effect diagram of the purities for each weight coefficient, and includes a weight coefficient $W_{B,2,5}$ display region 197b, a weight coefficient $W_{B,2,6}$ display region 197c, a weight coefficient $W_{B,5,3}$ display region 197d, and a weight coefficient $W_{B,5,7}$ display region 197e.

In each of the display regions 197b, 197c, 197d, and 197e, a polygonal line obtained by plotting and connecting by lines average values of the purities of three levels for each sub class in the main class (in this case, the main class B) as the adjustment target, and a polygonal line obtained by plotting and connecting by lines the average values of the purities of the three levels for each sub class in all the main classes (total).

Therefore, with the first factor effect diagram 196a illustrated in FIG. 18, it cannot be recognized how the overall purities change. However, with the second factor effect diagram 197a illustrated in FIG. 19, the sub classification model B and the overall purities can be compared, and when the weight coefficient to the seventh attribute data of the sub class 5 of the sub classification model B is changed to the weight coefficient obtained by adding 0.1 thereto, it can be easily recognized that the overall purity of the sub class 5 can be improved.

Returning to FIG. 14, the adjustment unit 151 determines the value of the weight coefficient to be adjusted from the factor effect diagrams of FIG. 18 and FIG. 19 (S14).

For example, the adjustment unit 151 adjusts, in the second factor effect diagram 197a of FIG. 19, the weight coefficient of the adjustment target to be the weight coefficient that exhibits highest average value of the purities of the three levels for each sub class in all the main classes (total).

As describe above, the defect classification apparatus 100 in this embodiment has functions of extracting the classification model and the sub class to be effectively adjusted, changing the weight coefficient corresponding to the extracted classification model and sub class, and adjusting the classification performance, with the result that the number of classes for which the result of automatic classification can be trusted may be increased and the number of steps of the visual classification by a person may be decreased.

Note that, this embodiment has been described with reference to the defect classification apparatus 100 including the SEM 110. However, the present invention is not limited to the SEM 110, and any detector may be used as long as an image of various wavelengths such as visible light, ultraviolet ray, and infrared ray may be taken. Further, the SEM 110 may be in a form separated from the defect classification apparatus 100 (separate casing or the like).

Further, this embodiment has been described with reference to the classification model having the two stages of the main classification model and the sub classification model. However, the present invention is also effectively applicable to first and second stages or second and third stages of a classification model having three stages.

REFERENCE SIGNS LIST

100 defect classification apparatus
110 SEM
130 general control unit
140 classification recipe adjustment device
141 storage unit
142 defect information storage region
143 weight coefficient information storage region
144 likelihood information storage region
145 classification performance information storage region
146 adjustment information storage region
148 control unit
149 classification unit
150 extraction unit
151 adjustment unit
153 interface unit
160 secondary storage device
170 input unit
180 output unit

The invention claimed is:

1. A defect classification apparatus which classifies, based on attribute data of defects obtained from image data obtained by taking an image of a test object, the defects into a group of first classes, and classifies, based on the attribute data of the defects classified into the group of first classes, the defects into a group of second classes, comprising:
  a storage unit which stores, for each of the defects, classification answer information which identifies the group of second classes to which the each of the defects is to be classified; and
  a control unit,
  the control unit performing the processings of:
  classifying the defects into the group of second classes based on a value obtained by multiplying a likelihood value determined for each of the group of first classes, each of the group of second classes, and each type of the attribute data by a value of a weight coefficient determined for the each of the group of first classes, the each of the group of second classes, and the each type of the attribute data;
  comparing the second classes to which the defects are classified and the second class to which the defects are to be classified, which is identified by the classification answer information, to calculate classification performance in each combination of the first classes and the second classes and in the second classes to which the defects are classified from all the first classes; and
  outputting classification performance information which associates the calculated classification performance with the each combination of the first classes and the second classes, and the second classes to which the defects are classified from all the first classes, to an output unit.

2. A defect classification apparatus according to claim 1, wherein the control unit further performs the processings of:
  identifying, in the classification performance information, the second classes for which the classification performance of the second classes to which the defects are classified from all the first classes is less than a predetermined value, and converting the classification performance of the identified second classes into a distinguishable display format; and
  identifying the first classes for which the classification performance in a combination of the identified second classes and the first classes is less than a predetermined value, and converting the classification performance of the identified first classes into a distinguishable display format.

3. A defect classification apparatus according to claim 1, the control unit further performs the processing of identifying, in the classification performance information, the second classes for which the classification performance of the second classes to which the defects are classified from all the first classes is less than a predetermined value, identifying the first classes for which the classification performance in a combination of the identified second classes and the first classes is less than a predetermined value, identifying combinations for which the classification performance in the combinations of the identified first classes and the second classes is equal to or more than a predetermined value, and identifying the first classes and the second classes belonging to the identified combinations as adjustment targets.

4. A defect classification apparatus according to claim 3, wherein the control unit is configured to:
  extract the weight coefficients corresponding to the first classes and the second classes identified as the adjustment targets, change the values of the extracted weight coefficients to calculate the classification performance, and identify the weight coefficient for which the classification performance is the highest; and
  set the identified weight coefficient as a weight coefficient used in classifying the defects into the group of second classes.

5. A defect classification apparatus according to claim 4, wherein the control unit extracts, from the weight coefficients corresponding to the first classes and the second classes identified as the adjustment targets, a predetermined number of the weight coefficients in a descending order of values.

6. A defect classification apparatus according to claim 4, wherein the control unit assigns orthogonal tables of a predetermined level to the extracted weight coefficients, and changes each of the extracted weight coefficients by a value corresponding to a level identified by the assigned orthogonal table to calculate the classification performance.

7. A defect classification apparatus according to claim 4, wherein the control unit performs the processing of generating, for each combination of the first classes identified as the adjustment targets and the weight coefficients, a first factor effect diagram which shows a value that identifies the calculated classification performance, and outputting the generated first factor effect diagram to the output unit.

8. A defect classification apparatus according to claim 4, wherein the control unit performs the processing of generating, for each of the weight coefficients, a second factor effect diagram which shows a value that identifies, of the calculated classification performance, the classification performance when the defects are classified as the second classes identified as the adjustment targets from all the first classes, and outputting the generated second factor effect diagram to the output unit.

9. A classification recipe adjustment method which is performed by a defect classification apparatus which classifies, based on attribute data of defects obtained from image data obtained by taking an image of a test object, the defects into a group of first classes, and classifies, based on the attribute data of the defects classified into the group of first classes, the defects into a group of second classes, the defect classification apparatus comprising a storage unit which stores, for each of the defects, classification answer information which identifies the group of second classes to which the each of the defects is to be classified, and a control unit, the classification recipe adjustment method comprising the steps of:

performing, by the control unit, the processing of classifying the defects into the group of second classes based on a value obtained by multiplying a likelihood value determined for each of the group of first classes, each of the group of second classes, and each type of the attribute data by a value of a weight coefficient determined for the each of the group of first classes, the each of the group of second classes, and the each type of the attribute data;

performing, by the control unit, the processing of comparing the second classes to which the defects are classified and the second class to which the defects are to be classified, which is identified by the classification answer information, to calculate classification performance in each combination of the first classes and the second classes and in the second classes to which the defects are classified from all the first classes; and performing, by the control unit, the processing of outputting classification performance information which associates the calculated classification performance with the each combination of the first classes and the second classes, and the second classes to which the defects are classified from all the first classes, to an output unit.

* * * * *